Figure 1:
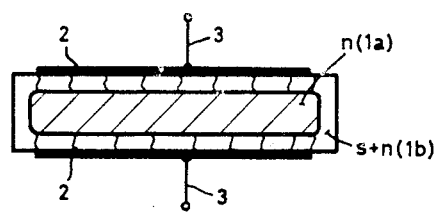

Nov. 17, 1964    W. CIRKLER ETAL    3,157,835
CERAMIC BLOCKING LAYER CAPACITOR
Filed Dec. 20, 1960

United States Patent Office 3,157,835
Patented Nov. 17, 1964

3,157,835
CERAMIC BLOCKING LAYER CAPACITOR
Werner Cirkler and Harald Löbl, Munich, Germany, assignors to Siemens & Halske Aktiengesellschaft Berlin and Munich, a Germany corporation
Filed Dec. 20, 1960, Ser. No. 77,140
Claims priority, application Germany, Apr. 29, 1960, S 68,273
12 Claims. (Cl. 317—262)

This invention is concerned with a blocking layer capacitor made of highly dielectric and preferably finely grained ceramic material.

The ceramic body of a known blocking layer capacitor has in its interior electron-yielding impurity centers while zones which are free of mobile charge carriers, so-called blocking layers, are formed in marginal areas which are provided with metal coating. These blocking layers exhibit in the presence of a polarization, "metal —, ceramic body +," a relatively high insulation resistance and with opposite polarization a relatively low pass resistance. The blocking layer capacitor comprises two blocking layers which are in this manner oppositely circuited. Accordingly, when an alternating voltage is placed on such capacitor, one of the two blocking layers will with each halfwave act as a capacity.

It is known to make such blocking layer capacitors of highly dielectric material, for example, of barium titanate. An impurity center doping is in such barium titanate dielectric obtained by addition of oxides of highgrade metals and/or by removal of oxygen. The marginal zones can be reoxidized by subsequent treatment in an oxygen containing atmosphere, with the result that the impurity center concentration is reduced or nearly completely cancelled in such marginal zones.

Previously known blocking layer capacitors are suitable only for low operating voltages. The loss factors are moreover relatively high, especially at high frequencies, thus limiting the field of application of such capacitors. Blocking layer capacitors of this kind have, for example, rated voltages up to 3 volt, an insulation resistance of about 2 to 50 kilo ohm, and a loss factor at 100 kilocycles of about $tg\ \delta \approx 1$.

The object of the invention is to eliminate these drawbacks and to provide blocking layer capacitors with considerably higher voltage stability as well as considerably higher insulation resistance in blocking direction and at the same time a low resistance in pass direction. The low resistance in pass direction assures even at high frequencies a low loss factor.

It has now been found that the number of electron yielding impurity centers which are required for the mechanics of the blocking layer capacitor and contained in blocking layers of the ceramic body bordering on the metal coatings, must not be uniformly distributed.

The invention contemplates, in connection with a ceramic blocking layer capacitor body made of highly dielectric barium titanate materials, which is interiorly enriched with impurity centers by reduction or by addition substances, to provide in the marginal layers bordering on the metal coatings, in which the impurity centers are reduced, for example, by re-oxidation, spatially limited areas with electron yielding impurity centers. According to the invention, these areas of high impurity center concentration in the marginal layer may be formed as separating layers between the highly dielectric crystal particles.

In these impurity center areas or regions, the impurity center terms shall assure a Fermi level lying energetically high above the valence band. In accordance with one feature of the invention a substance with high impurity center concentration can be embedded between the particles of the ceramic material during the production process. In accordance with another feature of the invention, there may be embedded a material in which impurity centers can be produced, by the application of subsequent steps, in easier manner than they could be produced in the basic material, and/or the impurity center concentration of which can be controlled by the application of suitable method steps. It is also possible to provide a suitable number of impurity centers by surface effects at the particle borders of the basic ceramic body.

Since the high dielectric constant of the basic ceramic body is also effective in the impurity center areas or regions, it is possible to combine the advantages of the impurity center carrier with the favorable properties of the basic material. This will be appreciated upon considering that, if the Fermi level of the impurity center carrier is high, there will occur a high diffusion action which produces, just as the effective dielectric constant, blocking layers of desired thickness and high insulation resistance. Due to its spatial concentration with respect to another substance modification, the impurity center concentration may be effected in the blocking layers, by suitable method steps, for example, during the reoxidation in the marginal zones, without affecting desired properties of the basic body. There will then appear an insulation resistance in the blocking direction, which can be compared with that of the undisturbed basic ceramic body, while the resistance for passing will be very low as compared with the blocking resistance. These favorable properties result in a relatively low loss factor. The voltage stability of blocking layer capacitors made according to the invention is as compared with previously known blocking layer capacitors improved three-to-tenfold, and the loss factor amounts, for example, at 100 kilocycles only to $\frac{1}{10}$ of that occurring at such frequency in connection with known blocking layer capacitors.

The treatment explained below is given as an example of the method of producing a blocking layer capacitor according to the invention.

In a barium titanate ceramic body of finely grained structure, with a particle size of about 2 microns, is produced at the particle borders an intermediate $TiO_2$ or $BaO2TiO_2$ layer, which is in known manner done by addition of $TiO_2$ or by washing out $BaO$. The $TiO_2$ excess amounts to about 2 to 10 mole percent. Sintering is thereupon effected taking care to maintain the small particle size of the ceramic body. A high impurity center concentration is now built up in the stoichiometric $BaTiO_3$ body as well as in the non-stoichiometric intermediate layers, by reduction at high temperature in a reducing atmosphere, for example, in a hydrogen containing atmosphere. Oxidation in an oxygen containing atmosphere within a temperature range between 750° C. and 850° C. results in partial or complete oxidation of the $BaTiO_3$ particles in the marginal layer of the ceramic body, while the impurity center concentration which is required for the mechanics of the blocking layer, is in the intermediate layers substantially maintained.

The oxidation process can also be combined with burning-in the metallization on the ceramic body. It was however found desirable to carry out the burning-in and the reoxidation separately so as to permit accurate control of the reoxidation and therewith the thickness of the blocking layer.

Blocking layer capacitors have been produced according to the invention with a rating up to 24 volt. Upon loading with 100 volt there were still insulation values present between $10^3$ and $10^4$ megohm. The loss factor at 100 kilocycles amounts to about $tg\ \delta \approx 0.1$.

FIG. 1 shows a blocking layer capacitor wherein the weakly s-doped marginal zone $1b$ exhibits impurity center doped n-regions. The interior of the ceramic body $1a$ is strongly *n*-doped. Upon the marginal layers 1*b* are metallized coatings 2 which are contacted by terminals 3.

Figure 2:
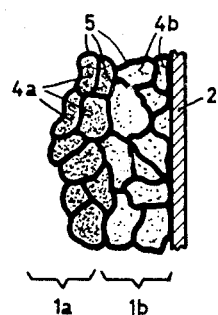

FIG. 2 shows a portion of the marginal zone of the blocking layer capacitor represented in FIG. 1. The highly dielectric particles 4*b* in the marginal zone 1*b* are largely freed of doping while the intermediate layers 5 are still strongly doped. In the interior 1*a* of the ceramic body, the particles 4*a* as well as the intermediate layers 5 are strongly doped with impurity centers.

Changes may be made within the scope and spirit of the appended claims which define what is believed to be new and desired to have protected by Letters Patent.

We claim:

1. A blocking layer capacitor exhibiting high voltage stability, high rated voltage, high insulation resistance, and low loss angle, comprising a ceramic body made of a mixture of metal titanate and titanium dioxide, wherein barium titanate is used as metal titanate and wherein the titanium dioxide content amounts to 2 to 10 mole percent, said body being formed with a highly dielectric interiorly doped structure and a marginal zone bordering on metal coating provided thereon, said marginal zone acting as blocking layer and containing spatially delimited areas with electron yielding impurity centers.

2. A blocking layer capacitor according to claim 1, wherein said interior doping is effected by reduction.

3. A blocking layer capacitor according to claim 1, wherein said interior doping is effected by addition substances.

4. A blocking layer capacitor according to claim 1, wherein said marginal zone is a reoxidized zone.

5. A blocking layer capacitor according to claim 1, wherein said impurity centers in said blocking layer are formed by intermediate layers extending between crystal particles.

6. A blocking layer capacitor according to claim 1, wherein said ceramic body has a finely grained structure with a particle size smaller than 5 microns.

7. A method of making a blocking layer capacitor, exhibiting high voltage stability, having a ceramic body made of highly dielectric interiorly doped material and having a marginal zone bordering on metal coating provided thereon, said marginal zone acting as blocking layer and containing spatially delimited areas with electron yielding impurity centers, said method comprising the following steps, namely, adding 2 to 10 more percent titanium dioxide to a finely grained stoichiometric barium titanate, pressing a body from this material, sintering said body to produce thin intermediate layers consisting of titanium dioxide between the grains and thereupon subjecting the body to reduction in a reducing atmosphere, reoxidizing the marginal zone of said body so as to reduce to a great extent the impurity center concentration in the particles thereof while substantially retaining the impurity center concentration in said intermediate layers, and placing upon said marginal zone electrically conductive coating.

8. A method according to claim 7, wherein the reduction is effected in a hydrogen containing atmosphere.

9. A method according to claim 7, wherein the reoxidation is effected in an oxygen containing atmosphere at temperatures lying between 750° C. and 850° C.

10. A method of making a blocking layer capacitor, exhibiting high voltage stability, having a ceramic body made of interiorly doped barium titanate material and having a marginal zone bordering on metal coating provided thereon, said marginal zone acting as blocking layer and containing spatially delimited areas with electron yielding impurity centers, said method comprising the following steps, namely, treating a finely grained stoichiometric barium titanate in a solvent to wash out barium oxide from the grain surfaces, pressing a body from this material, sintering said body to produce thin intermediate layers consisting of barium titanate with an excess of titanium dioxide between the grains and subjecting the body to reduction in a reducing atmosphere, reoxidizing the marginal zone of said body so as to reduce to a great extent the impurity center concentration in the particles thereof while substantially retaining the impurity center concentration in said intermediate layers, and placing upon said marginal zone electrically conductive coating.

11. A method according to claim 10, wherein the reduction is effected by a hydrogen containing atmosphere.

12. A method according to claim 10, wherein the reoxidation is effected in an oxygen containing atmosphere at temperatures lying between 750° C. and 850° C.

References Cited by the Examiner

UNITED STATES PATENTS

| 2,633,543 | 3/53 | Howatt | 317—262 X |
| 2,708,243 | 5/55 | Brajer | 317—262 X |
| 2,729,757 | 1/56 | Goodman | 317—262 |
| 2,916,681 | 12/59 | Brady | 317—262 |

SAMUEL BERNSTEIN, *Primary Examiner.*